United States Patent [19]

Hallock

[11] Patent Number: 5,474,024
[45] Date of Patent: Dec. 12, 1995

[54] CAGING SYSTEM WITH SLIDE BAR OPERATOR FOR QUICK DISCONNECT WATER FITTING

[75] Inventor: William J. Hallock, Hazleton, Pa.

[73] Assignee: Thoren Caging Systems, Inc., Hazelton, Pa.

[21] Appl. No.: 317,716

[22] Filed: Oct. 4, 1994

[51] Int. Cl.[6] .................................................. A01K 31/06
[52] U.S. Cl. ........................................................... 119/17
[58] Field of Search .................................... 119/15, 17, 18

[56] References Cited

U.S. PATENT DOCUMENTS

| | | | |
|---|---|---|---|
| 4,249,482 | 2/1981 | Harr | 119/17 |
| 4,343,261 | 8/1982 | Thomas | 119/15 |
| 4,402,280 | 9/1983 | Thomas | 119/15 |
| 4,690,100 | 9/1987 | Thomas | 119/17 X |
| 4,989,545 | 2/1991 | Sheaffer et al. | 119/17 |
| 5,000,120 | 3/1991 | Coiro, Sr. et al. | 119/15 |
| 5,042,429 | 8/1991 | Deitrich et al. | 119/15 |
| 5,044,316 | 9/1991 | Thomas | 119/15 |
| 5,048,459 | 9/1991 | Niki et al. | 119/17 |
| 5,148,766 | 9/1992 | Coiro, Sr. et al. | 119/17 |
| 5,165,362 | 11/1992 | Sheaffer et al. | 119/17 |
| 5,307,757 | 5/1994 | Coiro, Sr. et al. | 119/17 |

*Primary Examiner*—Gene Mancene
*Assistant Examiner*—Thomas Price
*Attorney, Agent, or Firm*—Eckert Seamans Cherin & Mellott

[57] ABSTRACT

An animal caging system includes a support such as a ducted rack for receiving animal cages at storage locations in a high density arrangement such as for testing laboratories, breeding establishments and the like. Closed cage boxes are received at the locations, each having an air impervious bottom and sidewalls, and a lid with an air permeable membrane on a frame. Complementary water supply fittings are provided on the rear of the cage box and on the rack or support, and are positively lockable and unlockable using a slide actuator that extends from front to the rear of the cage box, preferably being mounted in the frame of the lid. The fittings include male and female connection couplings, the female one having a movable spring biased locking sleeve that controls a radially displaceable body for engaging a groove in the male coupling, and a check valve that is opened by contact with the male coupling when inserted. An extension part of the sleeve extends into the path of the slide actuator, which is spring biased away from the extension part. The slide actuator is accessible from the front side of the cage box and allows the user to release the water hookup from the front side by displacement of the slide actuator against its biasing spring. Thus the water hookup is positive and easily locked or unlocked from the front side of the cage box.

17 Claims, 3 Drawing Sheets

CAGING SYSTEM WITH SLIDE BAR OPERATOR FOR QUICK DISCONNECT WATER FITTING

BACKGROUND OF THE INVENTION

1. Field of the Invention

The invention relates to the field of animal caging systems having removable enclosures for isolating one or more animals while providing for the supply of air and water, and facilitating access such that the animals can be serviced, e.g., to change bedding or to place food in the cage. The invention is apt for high density housing arrangements such as in testing laboratories, that house many animals in a compact space. Cage boxes, for example of molded plastic, have quick-connect water fittings that engage or release with displacement of a sleeve. The cages have lids with a fibrous air-permeable membrane stretched over a frame, and an actuator mounted in the frame is arranged to release the quick-connect fitting for each cage by manual action from the opposite side of the cage.

2. Prior Art

It is known to house animals such as laboratory mice, rats, rabbits, cats and the like, in cage rack systems having enclosures for individual animals or groups of animals disposed in close proximity. In addition to providing space for the animals, the enclosures isolate the animals from contagion originating with other animals or with human personnel, or perhaps quarantine animals who are contagious either to one another or to humans. Animals are housed in box enclosures, for example of clear polycarbonate, which are airtight on their sides and bottoms and fit against the undersides of internally ducted shelves for the supply of air. When the animals are serviced, the enclosures are removed from the rack and serviced in a work area that can also have enclosure means, a protected air supply, etc.

A source of contagion in such animal housing systems is the airborne dust and dander that the animals produce. To minimize the exposure of the animals to airborne contagion from other animals, the air supply can be filtered and the cage boxes or enclosures can be covered in a manner that permits airflow. In U.S. Pat. Nos. 4,343,261; 4,402,280; and 5,044,316, all to Thomas, airtight lids are sealed over the boxes and are provided with spring biased valves that are opened by contact with the rack as the cage is slid under a rack shelf. The valves open an airflow path through the supply and exhaust ducts, for coupling the internal volume of the cage to the air supply. When the cage is removed from the rack, the valves close and isolate the cage volume in an airtight manner. The cage can be opened in a protected environment for servicing.

Thomas '261 and '316 have individual valve bodies operable by downward pressure from the underside of a ducted shelf. Thomas '280 has a single sliding valve body that covers or uncovers all the valve openings, operable by pressure against a flange or stop encountered when the cage is fully inserted into place. Thomas '316 has a valved cage cover comprising an air permeable fibrous filter membrane, rather than airtight valved covers as in Thomas '261 and '280. Air diffuses through the cover when the cage is removed, so the levels of oxygen, ammonia and the like are less affected when the cage is removed and the valves close, than with an airtight cover. The disclosures of the Thomas patents are incorporated herein in their entireties.

Other animal housing systems having cage enclosures covered by filter material include U.S. Pat. Nos. 3,343,520—Schwarz, Jr.; 3,528,277—Lee et al; 4,480,587—Sedlacek; and British Patent 2,065,440—Bernardini. Typically, filter-covered cages are exposed to the open air rather than coupled to racks with internal air ducts.

In addition to air, the animals of course require food and water. Water can be supplied from a water bottle held in a depression in a wire grid disposed in the cage, having a nozzle depending into the cage area. The wire grid can also have a food compartment allowing the animals to obtain food by pulling it through spaces in the wire grid. An internal water bottle requires servicing including washing and refilling. It is desirable to provide a piped water supply to the cages to avoid the need for such service.

Water supply arrangements are disclosed, for example, in U.S. Pat. Nos. 4,989,545—Sheaffer et al; 5,000,120—Coiro, Sr. et al; 5,042,429—Deitrich et al; 5,148,766—Coiro, Sr. et al; and 5,165,362—Sheaffer et al, which are hereby incorporated. The nozzle of the water fitting typically is operable by the animals and can have a movable valve body. It is possible to provide a water nozzle or other outlet that is permanently attached and protrudes from a supply line to be received through an opening in the cage box as in Coiro '120. This is not preferred because an opening is left in the cage box when the cage box is removed from the rack for service, risking the ingress or egress of contagion. The water fitting also can become a source of cross contamination, namely if a different cage box is inserted into a given rack position after servicing. Therefore, a better technique is to attach the nozzle permanently to the cage box and to provide a water connection fitting that attaches the nozzle to the water supply when the cage is inserted into the rack, thereby opening a valve to the water supply. An example is shown in Deitrich '429.

The water connection fitting couples the water supply to the nozzle and the nozzle traverses the otherwise-airtight wall of the cage. The water connection fitting needs to close off the water supply tightly when the nozzle (which has its own valve) is removed and therefore is unavailable to provide a closure that prevents leakage. It is desirable that the water connection fitting provide a positive opening and closing action. However, the water connection fitting is located behind the cage box in the direction of insertion of the cage into the rack, and is inaccessible. It may be difficult to achieve a positive connection when inserting the cage box, which is done mostly by feel. If a water connection coupling is provided that has a very positive connection/disconnection action, it is typically difficult to disengage the water connection fitting when removing the cage box. As a result, water connection fittings are less positive than they could be, typically having a relatively loose spring biased arrangement urging a valve body to close, the valve body being displaced upon insertion of a cylindrical protrusion of the nozzle on the rear of the cage box.

Positive quick-coupling structures are known, for example in fittings for pressurized air lines. A female part on the supply side has an axially movable valve body that rests against a seat to close the valve. The valve body is pushed back from the seat by a complementary male part to open the valve. The male part has an annular groove near its distal end. The female part has several ball bearings or the like in a race providing for limited radial displacement clearance for the bearings. The bearings reside in the groove of the male part when the fitting parts are engaged, locking the male part to the female part against being blown off with pressure or inadvertently pulled apart.

A sliding collar on the female part has a smaller inside diameter portion and a larger inside diameter portion at different axial positions along the collar, the collar being axially movable either to position the smaller or larger diameter portion over the bearings. The smaller diameter portion normally holds the bearings radially inwardly, i.e., in the groove of the male part when the fitting is attached. When the collar is pushed back against axial spring bias, the larger diameter portion allows the ball bearings to be displaced radially outwardly from the groove in the male part such that the male and female parts can be attached or detached freely.

Although the collar can be tapered between the larger and smaller inside diameter portions and/or the distal end of the male part can be tapered, the annular groove of the male part is closely complementary to the bearings, as needed to lock the male and female parts together. If the male and female parts are pulled axially when locked together, there is no tendency for the collar to become displaced. Upon insertion of the male part, the locking of the bearings in the groove is perceptible to the user as a satisfying snap engagement that positively fixes the fitting.

Less positive fittings are possible for water connection fittings in animal caging systems. For example, instead of a locking collar, a resilient band can be used to bear inwardly on the male fitting. A structure having radially biased bearings or other locking structures can engage a tapered annular groove in the male member. The groove can have tapered walls, etc. Such features would enable the fitting to be engaged and disengaged simply by axial pressure to push the fittings together or pull them apart. A less-positive engagement, however, is likewise less effective for coupling together the parts.

It would be desirable to employ a positive water connection fitting in an animal caging system, for example using a structure similar to the foregoing pneumatic type fitting with an axially displaceable collar. However, positive fittings typically require manual displacement of a part such as the collar of the female fitting. Both fittings are inaccessibly located at the rear side of a cage box being inserted into the rack by the user, which may be the only practical place for such a fitting in view of the path of the cage box upon insertion and removal. The user cannot easily operate the release mechanism of such a fitting. It is an aspect of the present invention to resolve these matters by providing a displaceably means in the lid of the cage box that the user on the opposite side of the cage can use to manipulate the release means of the water connection fitting for conveniently engaging and disengaging the water connection in a positive manner.

SUMMARY OF THE INVENTION

It is an object of the invention to improve the efficiency of a water supply coupling to an animal cage box by providing a coupling control mechanism operable from a remote position relative to the coupling.

It is another object of the invention to employ a coupling for a water supply, of a type requiring the displacement of a locking pan in addition to simple insertion of complementary parts into one another, for positive locking and unlocking of the coupling.

It is a further object that displacement of said locking part is conveniently controlled from a position on the opposite side of the cage box.

It is still another object to facilitate a control as described, with minimal expense and complication of the cage structure and the support rack, and without requiring any substantial openings through which airborne material might pass into or out of the cage boxes.

These and other objects are accomplished by an animal caging system including a support such as a ducted rack for receiving animal cages at storage locations in a high density arrangement such as for testing laboratories, breeding establishments and the like. Closed cage boxes are received at the locations, each having an air impervious bottom and sidewalls, and a lid with an air permeable membrane on a frame. Complementary water supply fittings are provided on the rear of the cage box and on the rack or support, and are positively lockable and unlockable using a slide actuator that extends from front to the rear of the cage box, preferably being mounted in the frame of the lid. The fittings include male and female connection couplings, the female one having a movable spring biased locking sleeve that controls a radially displaceable body for engaging a groove in the male coupling, and a check valve that is opened by contact with the male coupling when inserted. An extension part of the sleeve extends into the path of the slide actuator, which is spring biased away from the extension part. The slide actuator is accessible from the front side of the cage box and allows the user to release the water hookup from the front side by displacement of the slide actuator against its biasing spring. Thus the water hookup is positive and easily locked or unlocked from the front side of the cage box.

The slide actuator preferably essentially comprises a flat metal bar stock that extends through closely fitting horizontally elongated slots at the extreme top of flanges of the frame of the lid. The bar is bent at right angles at each end, one end compressing a spring at the front side of the lid and a protruding end at the rear being bent to a right angle to engage an extension element that can be attached, for example by welding, to the sleeve of the female coupling. The slide actuator can have a slot that receives a post or screw on the frame, for limiting the travel of the slide actuator. Preferably the female coupling is disposed on the water supply side, on a conduit fixed to the support rack, and the male coupling protrudes from the cage and leads to a watering control operated by the animal, for example with a movable ball anti-drip closure. Alternatively, the polarity of the fittings can be reversed, with the female coupling on the cage side and a check valve arrangement in a male fitting on the supply side.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
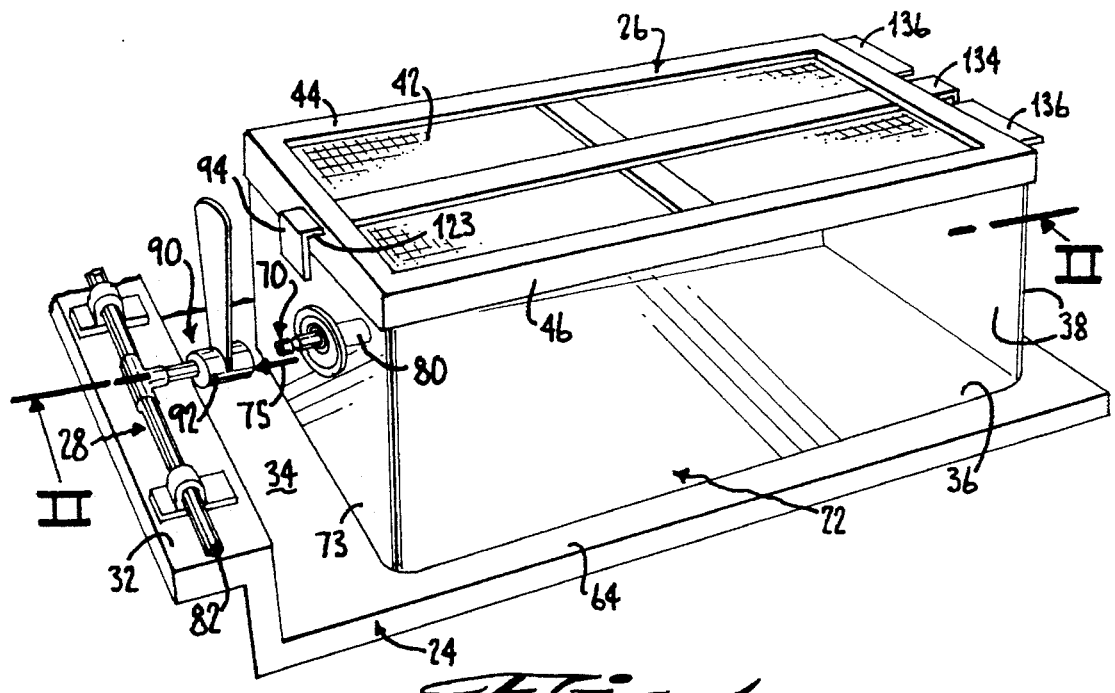
FIG. 1 is a perspective view showing one cage box of an animal caging system according to the invention, equipped with a water supply and actuator therefor.

The animal caging system of the invention is especially apt for high density housing arrangements wherein the animals are to be isolated for protection from the passage of dust and dander into or out of the cage boxes. A plurality of cage boxes 22 are to be stored at respective locations in a support rack 24, which can be a shelf system or a ducted shelf arrangement that carries air to and from the cages, for example as shown in U.S. Pat. Nos. 4,343,261; 4,402,280; and 5,044,316, to Thomas, the disclosures of which are incorporated herein. The invention is also applicable to less dense arrangements or arrangements that have only one or a few cage boxes.

In order to service the animals, for example to add food, change bedding and the like, the cage boxes 22 must be conveniently removable from rack 24. Cage box covers or lids 26 are fit over the open tops of the cage boxes, and can move with the cage box 22 to a protected area for service. After service and replacement of cover 26, the cage box 22 is returned to rack or support 24, and the animals remain isolated.

FIG. 1 generally shows a water supply arrangement 28 having fittings arranged on a support 32, the support being shown only schematically in FIG. 1, for coupling with an animal cage box 22 at a storage location 34, one such location being shown. Cage box 22 has a bottom 36 and four sidewalls 38, for example molded integrally of polycarbonate. Removable lid 26 has an air permeable filter membrane 42 on a frame 44 fixable on the sidewalls 38 of box 22, in particular by flanges 46 that extend down over the top edge 52 of cage box 22. The permeable membrane 42 can be a spun bonded polyester such as Dupont REEMAY, heat sealed to the upper surfaces of integrally molded plastic members forming frame 44. When lid 26 is in place, the bottom 36, sidewalls 38 and lid 26 encompass a chamber 54 for isolating one or more animals in cage box 22.

Figure 2:
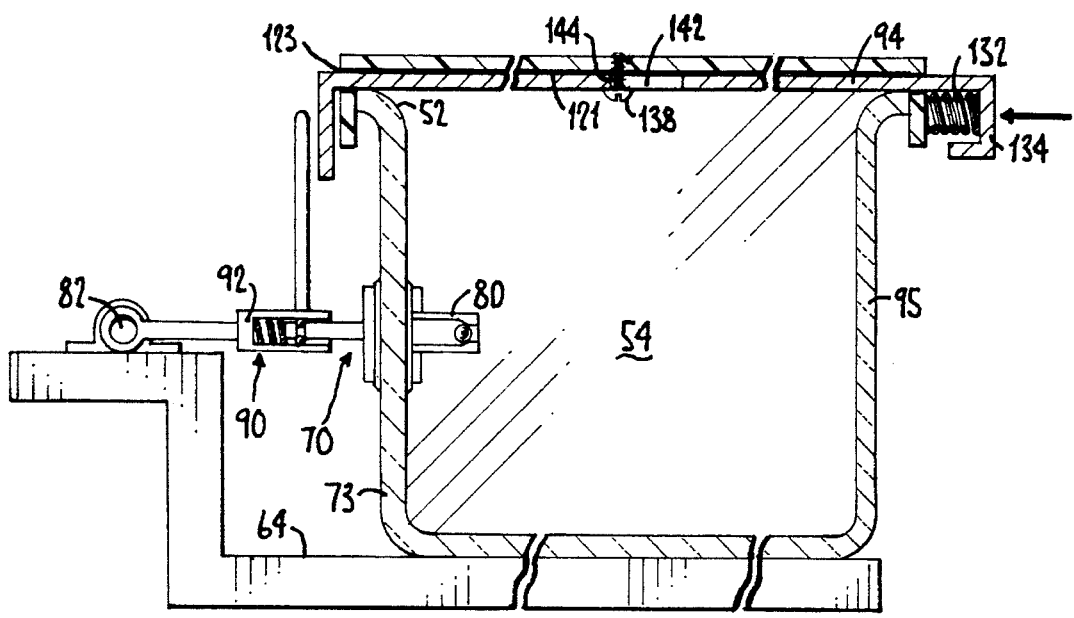
FIG. 2 is a section view taken along lines 2—2 in FIG. 1.
Figure 4:
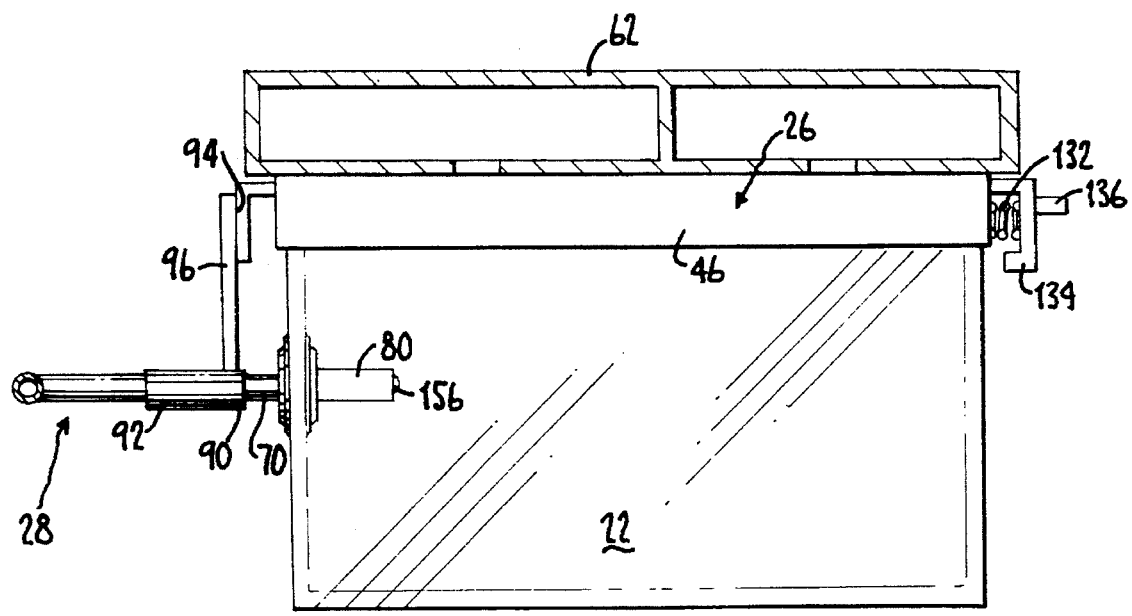
FIG. 4 is a side elevation, partly in section, showing a cage box received in a ducted rack.

The cage box can be arranged for receipt in a ventilating cage rack having internally ducted shelves 62 for supply and exhaust of air through cover 26 as shown in FIG. 4. Alternatively, as shown in FIGS. 1 and 2, a shelf-type rack 64 can be provided, having a horizontal support surface on which the cage box 22 is rested, being slid into place on its bottom 36.

For supply of water to the animal(s), cage box 22 has a first connection coupling 70 protruding from a rear one 73 of sidewalls 38 in the direction 75 of insertion of cage box 22 into its storage location 34, which in FIG. 1 is shown as viewed opposite the direction of insertion, on the front left in the drawing. Connection coupling 70 traverses sidewall 73 and has an animal-operated mechanism 80 inside cage box 22 for releasing water to the animal.

A supply conduit 82 is attached to the support or rack, and includes a second connection coupling 90 complementary to the first connection coupling 70, fixed in position at one of the storage locations 34. The first and second connection couplings 70, 90 are engageable and disengageable, generally by longitudinally fitting together complementary male and female ends of a quick disconnect type coupling. However according to an inventive aspect, the coupling requires displacement of a movable locking structure 92 associated with one of the first and second connection couplings 70, 90 for fixing and releasing the first and second connection couplings. A mechanism is provided for operating the locking structure 92 from the front of cage box 22.

In the embodiment shown in the drawings, the movable locking structure comprises an axially movable spring biased sleeve 92. A slide actuator 94 is movably mounted to frame 44 of lid 26 and extends along the lid from the rear sidewall 73 to a front sidewall 95 of cage box 22. Slide actuator 94 is accessible at from sidewall 95 for manual displacement by a user, and provides a means to operate locking structure 92.

Slide actuator 94 can be arranged to operate a locking mechanism on the fitting on the cage, but in the embodiment shown is arranged to operate the fixed fitting 90 on the supply side. Slide actuator 94 is movable to control fixing and releasing of the first and second connection couplings 70, 90 by manual action from the from sidewall. Thus the user can engage and disengage the fittings 70, 90 positively when cage box 22 is moved into and out of storage location 34, respectively.

The locking structure includes a sleeve 92 on female fitting 90, movable axially between a rest position at which the female fitting contracts internally to engage male fitting 70, and an unlocked position at which female fitting 90 expands to release male fitting 70. An extension part 96 is attached to sleeve 92 and extends into the path of slide actuator 94, for coupling slide actuator 94 mechanically to the movable locking structure of the lockable/unlockable one of the connection couplings 70, 90, in particular female coupling 90.

The connection couplings 70, 90 advantageously are similar to the type used as quick disconnects for pneumatic lines, and when the couplings are engaged, they resist axial disengagement. Connection couplings 70, 90 generally include substantially cylindrical complementary male and female parts. The female one 90 preferably includes a check valve 102 that closes when the male fitting 70 is removed, for example having a valve body 104 that is urged by line pressure to close against a seat 106, and is pushed back by male part 70 to open a flow path to the water supply.

Sleeve 92 has a spring 108 biasing sleeve distally 92, toward its locking position. A camming surface 110 on the inside of sleeve 92 is operable to urge female fitting 90 to constrict in the locking position. Axial displacement of the sleeve 92 via slide actuator 94 allows female fitting 90 to enlarge, whereby the first and second connection couplings 70, 90 are lockable and unlockable.

FIG. 2 shows the structure in section. Slide actuator 94 preferably extends along the inner surface 121 of cover 26, through slots 123 at the front and rear in the depending flange 46 of frame 44 of cover 26. A spring 132 is coupled between slide actuator 94 and flange 46 of lid 26, urging the slide actuator away from extension part 96, attached to sleeve 92. Spring 132 is arranged in a folded over receptacle 134 formed on the front end of slide actuator 94. The tension of spring 132 generally keeps the spring frictionally in place against frame 44 and slide actuator 94, respectively, or preferably, frame 44 is provided with front extensions 136 on either side of slide actuator 94, that prevent spring 132 from moving laterally out of position. The front extensions 136 of frame 44 also provide a convenient place to grasp the frame for pulling cage box 22 out of position while depressing slide actuator 94 against the pressure of spring 132, to disengage water connection couplings 70, 90.

Figure 3:
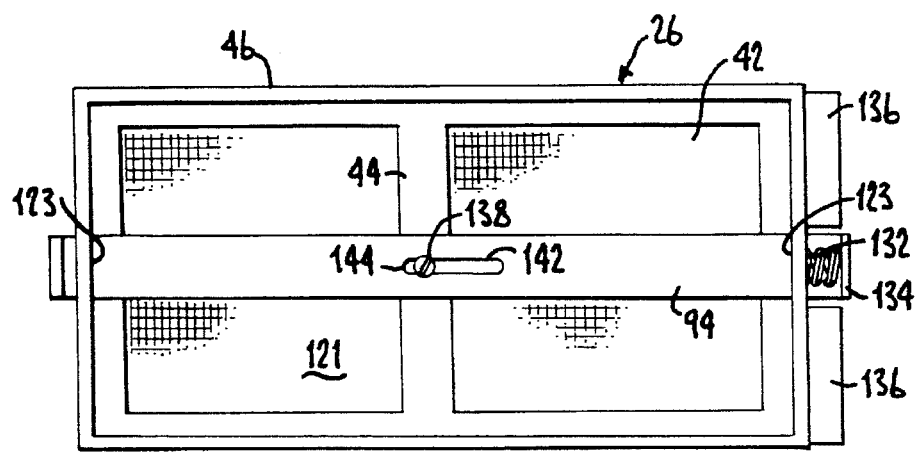
FIG. 3 is a plan view of the lid and actuator according to FIGS. 1 and 2, as viewed from below.

The slide actuator as shown in FIGS. 2 and 3, is mounted on cover frame 44 via a screw 138, extending through a slot 142 in actuator 94, the screw preferably engaging at the center of frame 44. Slot 142 in slide actuator 94 limits the forward displacement of the slide actuator when the closed rear end 144 of slot 142 abuts screw 138. In this position, the movable locking sleeve 92 of female part 90 is at its forward locked position, and the rear end of slide actuator 94, which also is preferably folded to provide a contact element for engaging against extension part 96 of sleeve 92, is either loosely in contact with the extension part or slightly spaced from the extension part.

Figure 5:
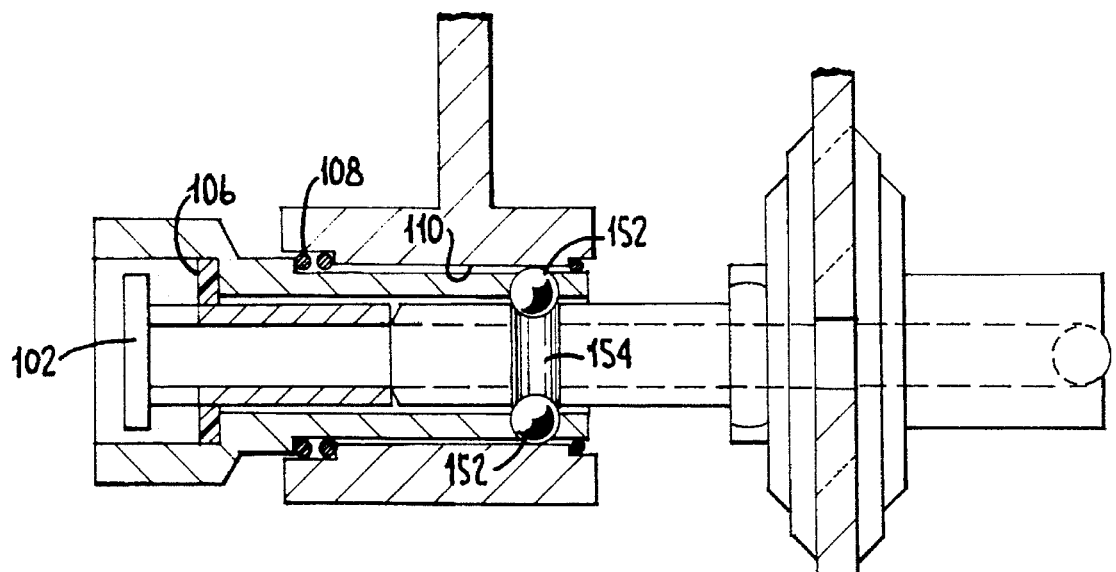
FIG. 5 is a section view showing the engagement of two complementary connection couplings according to the invention, in the locked state.
Figure 6:
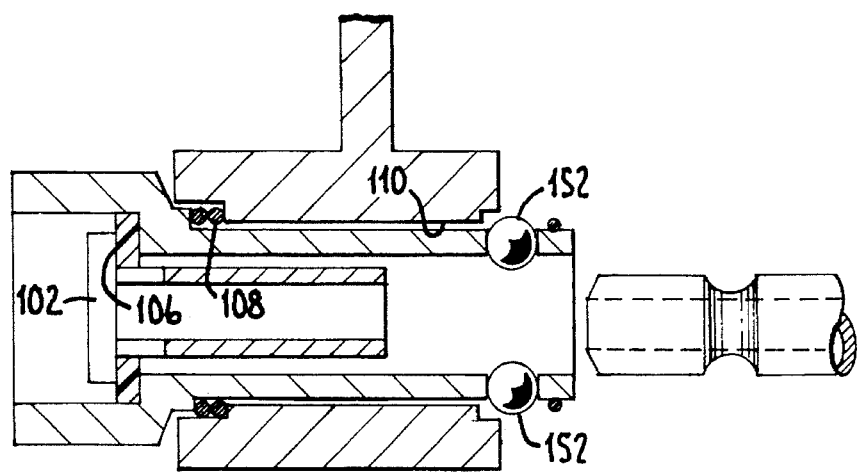
FIG. 6 is a section view corresponding to FIG. 5, with the couplings in the released state.

FIGS. 5 and 6 compare the locked and unlocked states of connection fittings 70, 90. The female fitting 90 as shown sectionally has at least one and preferably several radially movable bodies 152 disposed to contact the camming surface 110 inside sleeve 92, for constricting female fitting 90. The camming surface 110 can define a taper, opening toward the distal end of fitting 90, and the movable bodies 152 can be ball bearings. The complementary male part 70 has an annular groove 154 for receiving the radially movable body or bodies 152. In the locked state as in FIG. 5, the camming surface 110 is advanced by sleeve 92 and spring 108 toward the distal end and holds the movable bodies 152 inwardly in the annular slot of male fitting 70. In this state, the first and second connection fittings 70, 90 are positively locked together against axial separation.

In FIG. 6, when sleeve 92 is displaced proximally by operation of slide actuator 94, camming surface 110 is backed away to provide radial clearance for ball bearings 152, and male part 70 can be withdrawn freely together with cage box 22. FIGS. 5 and 6 also illustrate the check valve 102 in female fitting 90 for closing off the supply of water when male part 70 is withdrawn such that supply pressure forces check valve body 104 against seat 106. The male part 70 lifts check valve body 104 from seat 106 upon insertion, as shown in FIG. 5. Preferably, the male side of the coupling also includes a check valve that is operated by the animal, for example including a watering valve body 156 that the animal can push back from a seat 158 to open the flow of water.

It is possible with the addition of appropriate check valves to reverse the gender polarity of the arrangement. For example, by mounting the movable locking part 92 on the cage box 22, the cage can be made self contained and the actuator 94 can be mounted to the cage box rather than lid 26. In the event that the locking part is on cage 22, a check valve is needed on the supply side to close off the supply when cage 22 is not in place. Preferably, the actuator is mounted in the lid and operates a locking means of the supply side of the coupling.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. An animal caging system comprising:
   a rack supporting a cage box such that the cage box can be inserted into the rack and removed from the rack along an insertion path, the cage box having a first connection coupling at a rear of the cage box, facing forward along the insertion path;
   a supply conduit disposed on the rack, the supply conduit having a second connection coupling complementary to the first connection coupling, the first and second connection couplings being engageable and disengageable upon displacement of a movable locking structure associated with one of the first and second connection couplings;
   an actuator disposed on the cage box, the actuator having a movable element accessible from a front of the cage box and a contact element engageable with the locking structure of said one of the first and second connection couplings such that the locking structure is releasable manually by a user for at least one of engaging and disengaging the first and second connection couplings at the rear of the cage box.

2. The animal caging system according to claim 1, wherein the supply conduit is arranged to carry water under pressure, and wherein the locking structure of said one of the first and second connection fittings comprises a movable sleeve, the contact element being mounted to displace the sleeve upon displacement of the actuator.

3. The animal caging system according to claim 1, further comprising a lid disposed on the cage box, the lid fitting between the cage box and the rack when the cage is inserted, and wherein the actuator comprises a slide bar mounted in the lid.

4. The animal caging system according to claim 3, wherein the supply conduit is arranged to carry water under pressure, and wherein the locking structure of said one of the first and second connection fittings comprises a movable sleeve, the contact element being mounted to displace the sleeve upon displacement of the actuator, the contact element comprising an end of the actuator.

5. The animal caging system according to claim 4, wherein the first and second connection couplings comprise substantially cylindrical complementary male and female fittings, wherein the sleeve has a camming surface arranged such that axial displacement of the sleeve causes relative radial displacement of a portion of one of the male and female fitting for locking and release of the first and second connection couplings.

6. The animal caging system according to claim 5, further comprising an extension part attached to the sleeve, the contact element being movable via the actuator to engage the extension part for moving the sleeve into a position for one of locking and release, and a spring biasing means coupled to at least one of the actuator, the contact element and the sleeve, for biasing the sleeve into a position for locking the first and second connection couplings.

7. The animal caging system according to claim 6, wherein the spring biasing means comprises a spring coupled between the actuator element and the lid.

8. An animal caging system comprising:
   a support for receiving animal cages at storage locations;
   a cage box having a bottom, sidewalls and a lid, the lid comprising an air permeable membrane on a frame fixable on the sidewalls, the bottom, sidewalls and lid encompassing a chamber for isolating an animal in the cage box, the cage box having a first connection coupling protruding from a rear one of the sidewalls, and extending into the chamber for carrying water to the animal;
   a supply conduit fixed at one of the storage locations and having a second connection coupling complementary to the first connection coupling, the first and second connection couplings being engageable and disengageable upon displacement of a movable locking structure associated with one of the first and second connection couplings for fixing and releasing the first and second connection couplings;

a slide actuator movably mounted to the frame of the lid, the slide actuator extending along the lid from the rear sidewall to a front sidewall opposite from the rear sidewall, the slide actuator being accessible from the front sidewall for manual displacement by a user;

means coupling the slide actuator to the movable locking structure of said one of the first and second connection couplings;

wherein the slide actuator is movable to control said fixing and releasing of the first and second connection couplings from the front sidewall when the cage box is moved into and out of the storage location.

9. The animal caging system according to claim 8, wherein the locking structure of said one of the first and second connection fittings comprises a sleeve movable axially on a female one of the first and second connection couplings, and an extension part attached to the sleeve and disposed in a path of the slide actuator.

10. The animal caging system according to claim 9, wherein the first and second connection couplings comprise substantially cylindrical complementary male and female fittings, the sleeve including a spring biasing means urging the sleeve to a locking position and a camming surface operable to urge the female one of the fittings to constrict in the locking position, axial displacement of the sleeve via the slide actuator causing the female fitting to enlarge, whereby the first and second connection couplings are lockable and unlockable.

11. The animal caging system according to claim 10, wherein the female fitting is disposed on the supply conduit and a complementary male fitting is mounted on the cage box.

12. The animal caging system according to claim 11, further comprising a spring coupled between the slide actuator and the lid, for urging the slide actuator away from the extension part attached to the sleeve.

13. The animal caging system according to claim 8, wherein the first and second connection couplings include a female fitting comprising at least one radially movable body disposed to contact the camming surface for constricting the female fitting, and a complementary male part comprising an annular groove for receiving the radially movable body, whereby the first and second connection fittings are positively locked together when the radially movable body engages in the annular groove.

14. The animal caging system according to claim 13, further comprising a check valve in the female fitting, the check valve being opened by axial displacement thereof upon insertion of the male fitting into the female fitting.

15. An animal caging system comprising:

a rack supporting a cage box such that the cage box can be inserted into the rack and removed from the rack from a front side of the cage box, the cage box having a first connection coupling at a rear side of the cage box;

a supply conduit disposed on the rack, the supply conduit having a second connection coupling complementary to the first connection coupling, the first and second connection couplings being engageable and disengageable upon displacement of a movable locking structure associated with one of the first and second connection couplings;

an actuator carried on at least one of the cage box and the rack, the actuator having a movable element accessible from a front of the cage box and a contact element engageable with the locking structure of said one of the first and second connection couplings such that the locking structure is releasable manually by a user for at least one of engaging and disengaging the first and second connection couplings at the rear of the cage box.

16. The animal caging system according to claim 15, wherein the cage box comprises a lid, and the actuator is at least partly carried by the lid.

17. The animal caging system according to claim 16, wherein the lid fits between the cage box and the rack when the cage is inserted, and wherein the actuator comprises a slide bar mounted in the lid.

* * * * *